United States Patent
Wofsey

[15] 3,694,621
[45] Sept. 26, 1972

[54] NULL LAW PENETRATION CONTROL APPARATUS FOR FUSION WELDING

[72] Inventor: David Wofsey, 3368 South Ulster Ct., Denver, Colo. 80231

[22] Filed: Jan. 25, 1971

[21] Appl. No.: 109,338

[52] U.S. Cl. .......................... 219/131 F, 219/125 PL
[51] Int. Cl. ............................................. B23k 9/10
[58] Field of Search..219/131 R, 131 UR, 131 F, 125 PL, 219/69 C, 69 G; 318/650

[56] References Cited

UNITED STATES PATENTS

| | | | |
|---|---|---|---|
| 2,529,111 | 11/1950 | Steinberger | 219/131 F |
| 3,264,447 | 8/1966 | Agnew | 219/131 F X |
| 3,233,076 | 2/1966 | Vilkas | 219/131 F |
| 3,335,254 | 8/1967 | Vilkas et al. | 219/131 X |
| 3,426,175 | 2/1969 | Hahne | 219/125 PL |
| 2,636,102 | 4/1953 | Lobosco | 219/131 F |
| 3,443,057 | 5/1969 | Allen et al. | 219/131 R |
| 3,373,914 | 3/1968 | Wall, Jr. | 219/125 PL X |
| 3,048,692 | 8/1962 | Bichsel et al. | 219/131 F X |

*Primary Examiner*—R. F. Staubly
*Assistant Examiner*—Gale R. Peterson
*Attorney*—Brady, O'Boyle & Gates

[57] ABSTRACT

A non-consummable electrode welding system providing direct control of penetration while maintaining a constant distance with respect to the surface of the weld plate and the welding torch while the welding arc current is varied as a function of the distance between the tip of the welding electrode and the surface of the weld puddle. The arc voltage is automatically compared with a reference voltage with the difference therebetween effecting a change in the arc current to cause the puddle position to immediately vary until the arc voltage is equal to the reference voltage. In the subject system the weld puddle is removed as an element in the control loop of the servo system controlling the torch position which results in a higher degree of stability and relatively faster response.

11 Claims, 9 Drawing Figures

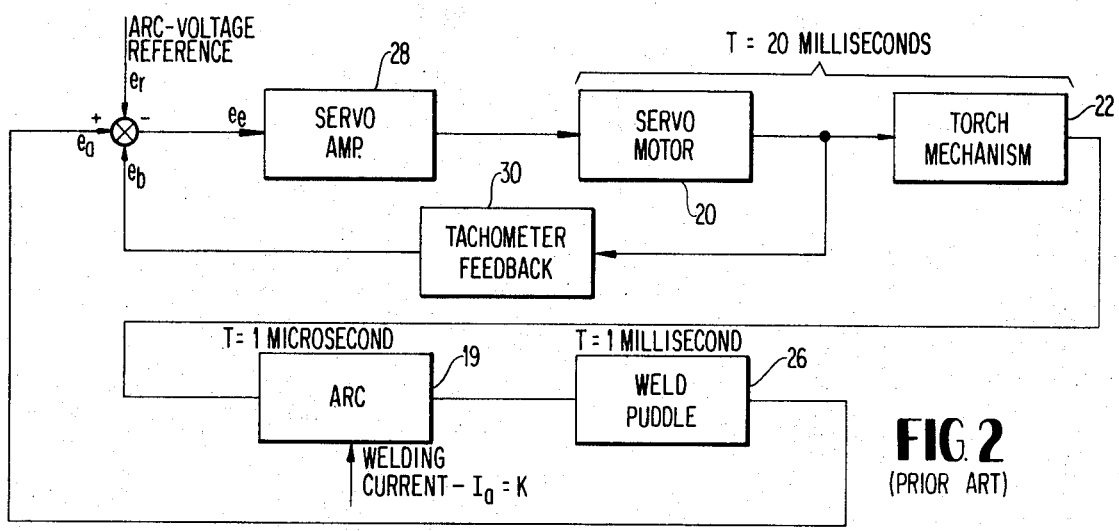
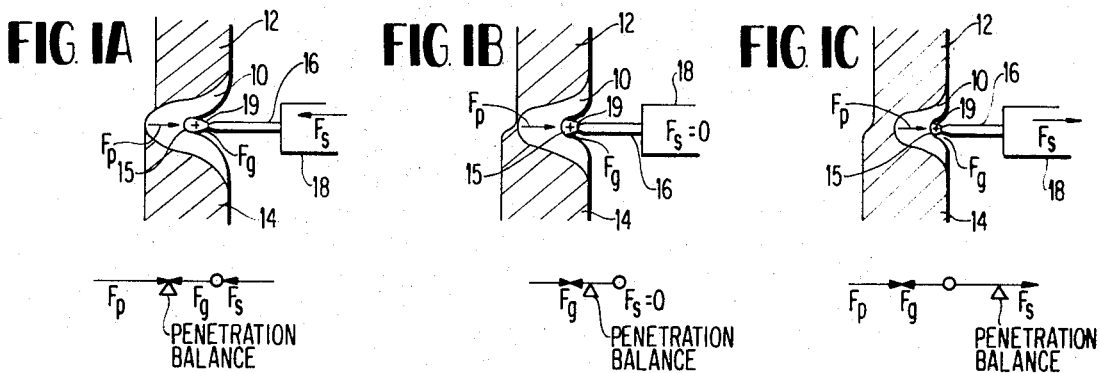
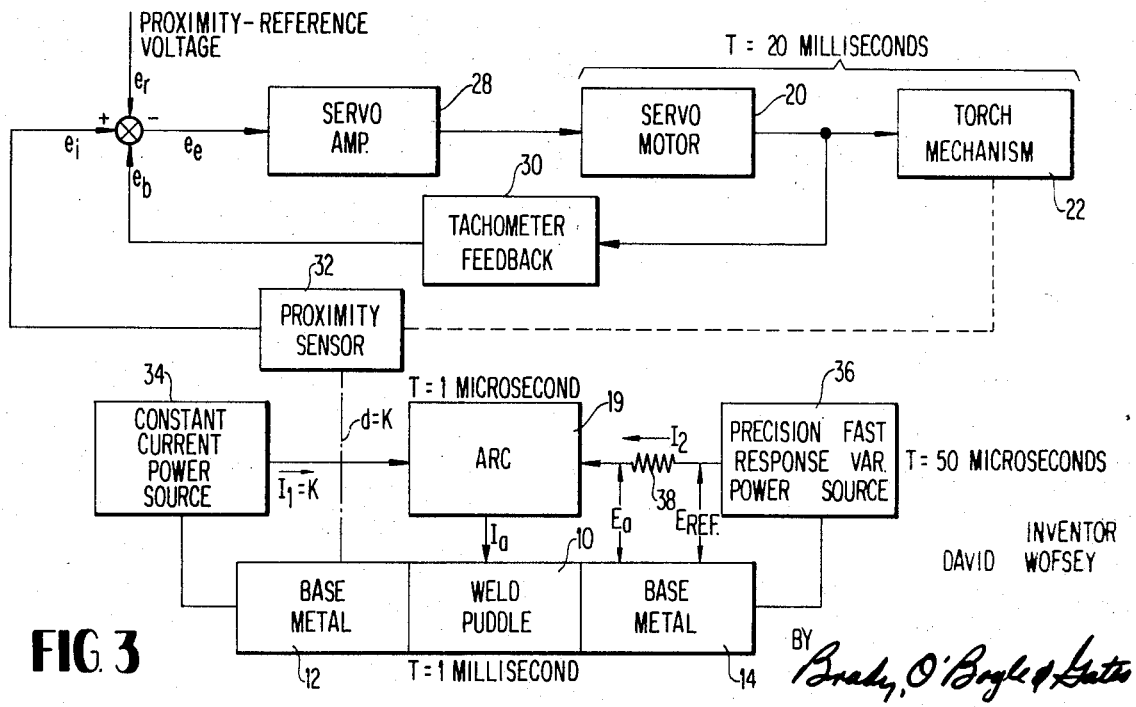
INVENTOR
DAVID WOFSEY
BY Brady, O'Boyle & Gates
ATTORNEYS

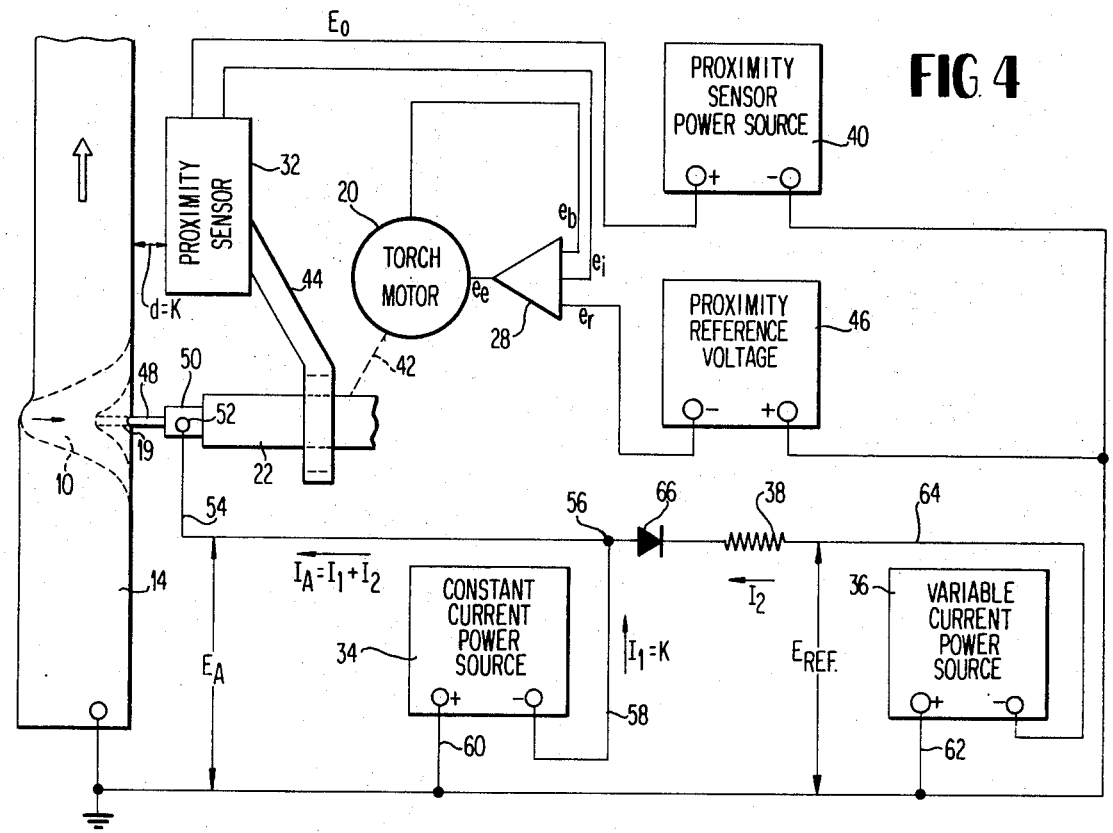
FIG. 4
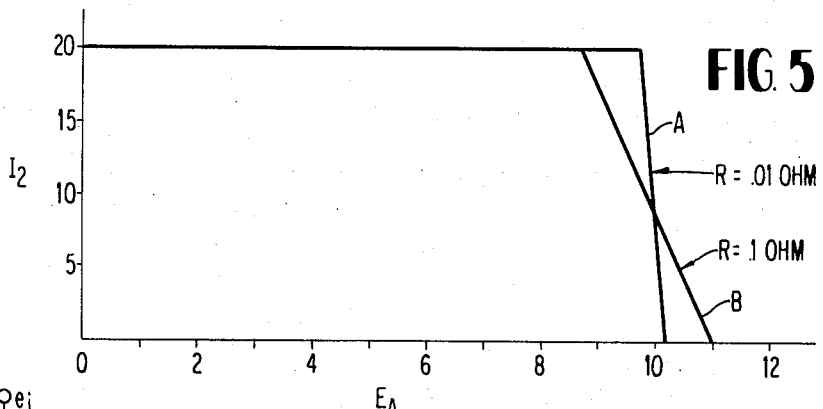
FIG. 5
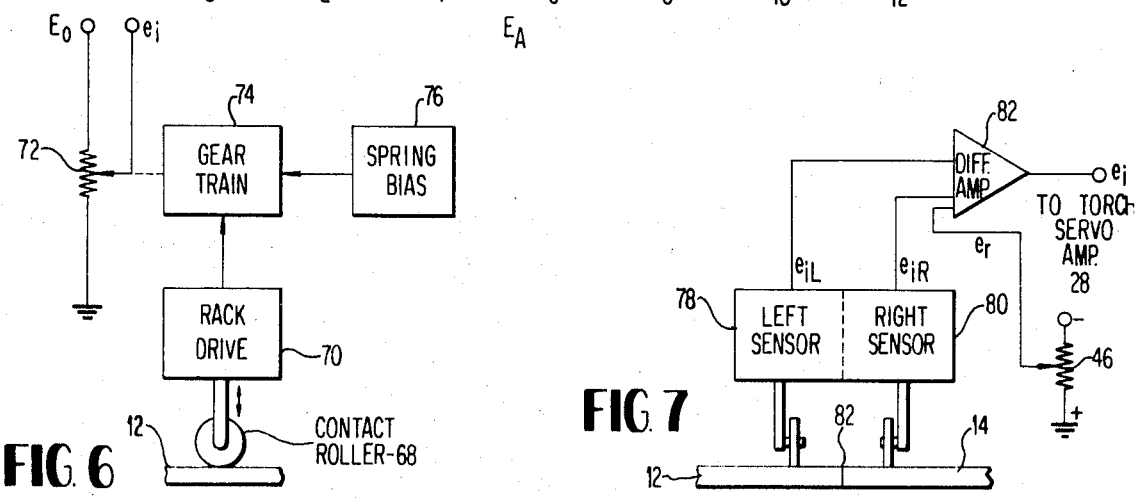
FIG. 6
FIG. 7

NULL LAW PENETRATION CONTROL APPARATUS FOR FUSION WELDING

BACKGROUND OF THE INVENTION

1. Field of the Invention

This invention relates to arc welding systems including a substantially non-consummable electrode and more particularly to a system for providing welding penetration control.

2. Description of the Prior Art

In prior art automatic arc welding systems having a non-consummable electrode, the arc voltage between the electrode and the workpiece is measured and compared with a preset reference voltage. The error, if any, is amplified and fed to a motor controlled welding head to adjust the electrode holding device toward and away from the workpiece to maintain constant arc voltage. This is commonly referred to as the arc-voltage proximity system and differs from a system which is directed to the control of the weld penetration. In the first mentioned type of system, the uniformity of welds has depended primarily on the skill of the operator inasmuch as variations of metal thickness, gap, gas flow and amperage changes can result in momentary loss of penetration that is not controllable.

Additionally, attempts to control penetration has heretofore been attempted by the use of infra-red sensing or torch position error, e.g. U.S. Pat. No. 3,233,076, "Welding Control System," issued to E. P. Vilkas. A problem arises, however, due to the fact that the corrective response of current that is generated by either an infra-red or torch position error signal is many times slower than the rapid motion that the puddle itself is capable of. As a result, direct control of penetration is not achievable due to the fact that the weld puddle and welding arc are all part of a closed loop servo system including the torch positional mechanism.

SUMMARY

The present invention is directed to a penetration control system wherein process variations are instantly compensated for with a corresponding amperage change which results in a change of arc temperature, and a corresponding arc pressure change that is directed against the surfaces of the weld puddle to maintain constant penetration. Briefly, this is accomplished by utilizing a torch positional servo loop which is responsive to the top or upper surface of the welding plate but which is independent of the welding arc and weld puddle. The welding arc is produced by an independent arc current control loop comprised of a constant current welding source, a variable current welding source, a current blocking diode and a resistance coupled together across the welding plate and torch. The current blocking diode is polarized so that current can flow freely from the variable power supply; however, current from the constant current source is blocked from entering the variable power source. One like output terminal of both power supplies is commonly connected to the welding plate while the other output terminal of the power supplies are interconnected by means of a series circuit including the diode and the resistor with the diode and the constant current source being directly connected to the torch. The arc voltage, therefore, appears across the constant current power source and is a function of the distance between the tip of the non-consummable electrode and the surface of the weld puddle which is referenced to the front surface of the base metal. The variable supply source establishes a reference voltage across its output terminals and any change in the puddle surface position with respect to the electrode tip is sensed as a change of arc voltage which is instantly corrected by a corresponding change of arc current supplied from the variable supply source due to the difference voltage appearing across the resistor and the diode since the output current of the constant current power source is maintained at a constant value.

BRIEF DESCRIPTION OF THE DRAWINGS

FIGS. 1A, 1B and 1C are diagrammatic illustrations of the dynamics of a welding puddle and the forces encountered which are helpful in understanding the problems encountered in the prior art;

FIG. 2 is a block diagram illustrative of a typical prior art arc welding system;

FIG. 3 is a block diagram illustrative of the preferred embodiment of the subject invention;

FIG. 4 is a schematic diagram more fully disclosing the preferred embodiment of the subject invention shown in FIG. 3;

FIG. 5 is a graph illustrative of the operating characteristics of the subject invention;

FIG. 6 is a diagram illustrative of a typical proximity sensor; and

FIG. 7 is a block diagram illustrative of yet another proximity sensor.

DESCRIPTION OF THE PREFERRED EMBODIMENT

In order to more fully understand the inventive concept of the subject invention, the dynamics of a weld puddle should first be considered. A weld puddle such as shown by reference numeral 10 in FIGS. 1A through 1C comprises the molten metal between weld plates 12 and 14 and consists of a cavitation or crater 15 wherein the viscosity of the molten metal increases in direct proportion to the distance away from the tip of a welding electrode 16 attached to a welding torch generally illustrated by reference numeral 18 and producing an arc 19. The weld puddle 10 behaves like a small mass on a spring in partial compression which exhibits a reactive force $F_p$ in response to arc pressure $F_a$ which is a function of the arc temperature which in turn is a function of the arc current $I_a$. The voltage of the arc which may be identified as $E_a$ is a function of the distance from the tip of the welding electrode 16 to the weld puddle surface. As a result, the variation of the puddle position which results in penetration is a direct function of $E_a$. An incremental decrease of $E_a$, moreover, is indicative of a chilling or a movement of the puddle toward loss of penetration, i.e., movement of the surface of the puddle 10 towards the tip of the electrode 16. Yet one additional force must be considered, and this is the force $F_s$ which is due to the torch mechanism which exerts a force downwardly towards the puddle and references the centroid of the arc 19. The summation of these instantaneous reactions is the dominant factor resulting in the weld process. For maximum control of the fusion welding process therefor, the regulating system must be capable of responding in a time greater than the elemental response time of the weld puddle itself. It can be shown that the spring rate or response time of the weld puddle 10 is in the order of 1 millisecond. This being the case, a regulating system must have a response time considerably less than 1 millisecond and preferably in the order of 100 microseconds. In recognition of this fact, it should be pointed out that all prior art electromechanical servo systems such as shown in FIG. 2 are incapable of reacting sufficiently fast thereby placing a limit on the nature of the weld.

Considering now prior art systems, reference is made to FIG. 2 wherein a welding control loop is shown in block diagrammatic form including a servo motor 20 which is coupled to and controls the movement of a torch mechanism 22 to and from a workpiece, not shown. The torch mechanism 22 directly controls the welding arc 19 which in turn produces the weld puddle 26 which establishes an arc voltage $e_a$. This voltage is then compared against a preset reference voltage $e_r$ supplied from a source not shown. The error voltage $e_e$, if any, is amplified in a servo amplifier 28 and fed to the servo motor 20 to adjust the torch mechanism 22 toward or away from the workpiece until a zero error signal is obtained and thereby maintain a constant arc voltage. The welding current $I_a$ in the arc 19 is maintained at a substantially constant value. A second feedback loop including a tachometer feedback network 30 is coupled around the servo amplifier 28 in the servo motor 20 in order to maintain the proper signal response between the servo amplifier and the servo motor itself. It can be seen, therefore, that the arc voltage $E_a$ in the system shown in FIG. 2 is dependent upon the response time of the servo motor 20 and the torch mechanism 22 which is shown to be in the order of 20 milliseconds. However, as noted earlier the weld puddle 26 response time is in the order of 1 millisecond.

Spurious responses of the arc can be generated by impurities in the shielding gas, tungsten erosion, or contamination from the weld puddle itself. In such an event, the ionization potential of the arc is shifted and a spurious error signal to the servo amplifier results. This spurious condition is further deteriorated by the dynamic change in the arc pressure $F_a$ which immediately produces a force change on the weld puddle. A velocity moment is immediately produced in the weld puddle which is further aggravated by the relatively slow response of the torch motion due to the spurious error signal from the arc. This can be further demonstrated with reference to FIGS. 1A, 1B and 1C.

Referring now to FIG. 1A, there is illustrated a system which is balanced with the torch servo force $F_s$ biased into the puddle 10 and wherein the reactive force of the puddle $F_p$ equals the summation of the force of the arc pressure $F_g$ and the servo force $F_s$. A decrease in the arc current results in an immediate decrease in the arc temperature which decreases the arc pressure $F_g$ which releases tension on the puddle and decreases $F_p$. At that moment the system becomes unbalanced and the torch servo force $F_s$ goes to zero at the instant the servo motor starts to reverse. This is shown with reference to FIG. 1B. As the torch servo motor reverses in response to the decreased arc voltage causing the force $F_s$ to be in an opposite direction. However, the system unbalance is increased due to the time lag in overshoot of the servo system and as a result penetration may be lost.

In order to overcome the inherent limitation of response time exhibited by the prior art device, the present invention has for its objective the removal of the weld puddle from the servo control loop and reference of the torch position to the surface of the weld plate only rather than the surface of the weld puddle. This is shown in block diagrammatic form in FIG. 3. Considering now FIG. 3, two separate and independent control loops are illustrated. The first control loop includes the torch mechanism 22 which is mechanically coupled to a proximity sensor 32 which is responsive only to the upper surface of the base metal plate 12 to produce an output signal $e_i$ which is a measure of the distance between the tip of the electrode 16 and the surface of the base metal 12. The signal $e_i$ is compared with a proximity reference voltage $e_r$ and an error signal $e_e$ is applied to the servo amplifier 28 which applies a signal for operating the servo motor 20 to drive the torch mechanism and the attached proximity sensor to a null position where the signal $e_e$ is zero. Thus the torch mechanism 22 is constrained to a substantially constant distance from the upper surface of the base metal 12 and therefore is not exposed to transient responses of the arc 19.

The second control loop involves the arc current $I_a$ which is now comprised of two components $I_1$ and $I_2$. The current $I_1$ is held constant and is applied from a first power source 34. A second power source 36 which is a precision variable power supply having an extremely fast response in the order of 50 microseconds is adapted to supply a second or variable current component $I_2$ to the arc current $I_a$. The source 36, moreover, is substantially a constant voltage supply with current limiting means such that when a predetermined maximum current limit is reached it electronically switches to a transitory constant current mode, but reverts back to a constant voltage mode when the current demand falls below this limit. A power source having operational characteristics such as described with reference to the second source 36 is well known and is presently commercially available, a typical example being manufactured by the NJE Corporation and identified as Model CS 36–SYSR 60.

The first power source 34 is directly connected to the arc 19 while the second power source 36 is coupled to the arc through a resistive impedance 38. The second power supply is adjusted to establish a reference voltage $E_{ref}$ across one side of the impedance 38 while the arc voltage $E_a$ appears on the other side thereof. The difference between the reference voltage $E_{ref}$ and the arc voltage $E_a$ constitutes a voltage drop across the resistor 38 which causes the current $I_2$ to flow to the arc according to the relation, $I_2 = (E_{REF} - E_a)/R$. Thus as the weld puddle surface position is adjusted by the variation of the arc current $I_a$ due to the corrective response of $I_2$, the arc voltage $E_a$ continually reflects the position of the weld puddle surface and maintains the position of the weld puddle by an instantly corrected corresponding change of the current $I_2$. In this manner the puddle velocity component is essentially low because the correction time response to the arc is much, much greater than the response time of the weld puddle itself.

The invention is more fully disclosed in FIG. 4 wherein the proximity sensor 32 is powered from a voltage $E_o$ supplied from a proximity power source 40. The sensor 32 in turn feeds its output signal $E_i$ which is a function of distance from the base metal member 12 to the servo amplifier 28 coupled to the torch motor 20. The torch motor 20 is shown schematically coupled to the torch mechanism 22 by means of suitable mechanical positional means 42. An offset connector arm 44 interconnects the proximity sensor 32 to the torch mechanism 22 so that the proximity sensor 32 is positioned over the weld plate 12. The travel of the torch mechanism 22 is shown by the direction arrow.

Additionally, a proximity reference voltage source 46 is illustrated having its negative output terminal connected to the servo amplifier 28 while its positive terminal is coupled to a point of reference or ground potential which is common to the weld plate 14. The proximity reference voltage source 46 applies a signal $E_r$ to the servo amplifier 28 for maintaining the distance d between the proximity sensor 32 as well as the torch mechanism constant with respect to the upper surface of the welding plate.

The torch mechanism 22 shown in FIG. 4 additionally includes a non-consummable tungsten welding electrode 48 held by means of a chuck 50. The welding arc 19 is shown directed into the crater 15 of the weld puddle 10. Electric power for initiating and sustaining the welding arc 19 is applied to a terminal 52 on the chuck 50. An arc current conductor lead 54 is next connected between terminal 52 and an external circuit terminal 56. The negative (−) output terminal of the adjustable constant current power source 34 is connected to circuit terminal 56 by means of a circuit lead 58 while the positive (+) terminal is coupled to ground by means of circuit lead 60. The precision variable power source 36 which is also adjustable has its positive power terminal connected to ground by means of circuit lead 62, however, its negative output terminal is coupled to circuit terminal 56 by means of circuit lead 64, the resistor 38, and a diode 66. Diode 66, moreover, is a current blocking diode and is poled to allow current to flow in one direction only, i.e., from the negative terminal of power source 36 to the welding electrode 48. Although it is preferable to connect the negative poles of the power sources 34 and 36 to the tungsten electrode 48 operation can still be achieved with a polarity reversal of both sources when desirable. In the instant embodiment, the directional arrows for I, $I_2$ and $I_1$ indicate "electron" flow as opposed to the usual current convention, i.e., considering current flow being from + to − because the positive terminals of the sources 34 and 36 are grounded.

Since the position of the torch 22 is held constant with respect to the surface of the weld plate 12, the arc voltage $E_a$ is a direct function of the electrode 48 tip to puddle surface distance. It can be seen, therefore, that the resistor 38 which is a power dropping resistor effectively measures the difference between the arc voltage $E_a$ and $E_{ref}$ which is established by selectively adjusting the source 36. For a predetermined welding operation, the value of the constant current $I_1$ is first determined and then the variable current precision power source 36 is adjusted to provide a predetermined reference voltage $E_{ref}$. It is to be noted that when the magnitude of the arc voltage $E_a$ is equal to or greater than the reference voltage $E_{ref}$, the value of the current $I_2$ is zero. It has been observed, however, that for optimum penetration, the following operating parameters are required.

$$I_a = I_1 + 0.5 I_{2max}$$

where $I_{2max}$ is the current specification limit of a power supply 36. If the resistance 38 is chosen, for example, as 0.1 ohm and $E_a$ is 10 volts, the value of $0.5 I_{2max}$ is 10 amperes and the forward resistance of the diode 66 is considered to be zero, then the reference voltage $E_{ref}$ which must be established by the variable supply source 36 is:

$$E_{ref} = 10 + 10 (0.1) = 11.0 \text{ volts}.$$

The slope of the current voltage response can be adjusted by the choice of the resistance of resistor 38 and the corresponding adjustment of the reference voltage $E_{ref}$. This is shown, for example, by the characteristic curve illustrated in FIG. 5. A choice of a reference voltage $E_{ref}$ of 10.1 volts and a resistance of 0.01 ohms results in a current voltage response of 100 amperes per volts as shown by curve A thereof. The response of a resistance equal to 0.1 ohms is shown by curve B. Thus, for example, where the arc voltage is approximately 10 volts, any decrease of penetration wherein the puddle to electrode distance is reduced there is a correspondingly instant decrease in $E_a$. Now the difference of potential between $E_{ref} - E_a$ results in an increase in current $I_2$, causing the value of the arc current $I_a$ to increase. The increase in arc current $I_a$ increases the temperature and pressure of the arc 24 causing the puddle penetration to increase and reach a null position. On the other hand for the case of excessive penetration, the puddle surface to electrode tip distance becomes excessively large and a correspondingly increase in the arc voltage $E_a$ results. This follows with a decrease of $I_2$ which results in a decrease of $I_a$. What is to be noted, however, is that the return of the puddle to its null position occurs in a very short time constant because the necessary current change in the arc current $I_a$ has occurred at a rate faster than weld puddle response time.

FIGS. 6 and 7 are merely illustrative of two embodiments of proximity sensors which are adapted for use by the subject invention. The first embodiment shown in FIG. 6 comprises a contact roller 68 which is adapted to roll upon the surface of the weld plate 12. The contact roller is coupled to a rack drive mechanism 70 which is coupled to the slider element of a potentiometer 72 by means of a suitable gear train 74 which is biased by a spring 76. Thus any movement of the contact roller 68 is transferred to the slider of the potentiometer 72. The fixed output $E_o$ of the proximity sensor power supply 40 is applied across the potentiometer 72 whereupon a signal $e_i$ which is a measure of the vertical displacement of the contact roller 68 above the surface of the base metal 12. The other embodiment comprises a left and a right sensor 78 and 80, and which may be, for example, similar to that shown in FIG. 6, which is adapted to straddle the seam 82 between two weld plates 12 and 14. In such an embodiment, two outputs are provided which are identified as $e_{il}$ and $e_{ir}$ which are added and compared to the proximity reference voltage $e_r$ and fed into a differential amplifier 82 to provide a single output voltage $E_t$ to the torch servo amplifier 28.

When desirable remote control or programming of the variable current power source 36 can be provided for purpose of controlling the reference voltage and the maximum current limit thereof. Also means can be provided for varying the magnitude of the series resistor 38 for selectively controlling the voltage/amperage response as shown in FIG. 5.

In summation, therefore, the present invention removes the weld puddle from the torch servo system and the torch position is controlled by an independent proximity sensor, which is referenced to the surface of the base metal. As a result, any change of the puddle surface position is reflected as a change in arc voltage which is instantly corrected by a corresponding change of arc current supplied from a variable current supply having a response time in the order of 50 microseconds in conjunction with a constant current provided by a constant current power source. Since the response time of the weld puddle is in the order of 1 millisecond, the necessary current adjustment takes place long before the spring rate of the weld puddle has an opportunity to oscillate and therefore the weld puddle will assume a null position in a very rapid but smooth transition.

Having disclosed what is at present considered to be the preferred embodiment of the subject invention, I claim as my invention:

1. A system for fusion welding comprising in combination:

a welding torch including a welding electrode fixedly mounted thereto for producing a welding arc and a weld puddle at a predetermined location on a base metal member;

welding torch positional control means coupled to said welding torch, said control means being exclusively operative with respect to the surface of said base metal at a selected location away from said weld puddle for maintaining a substantially constant distance between the surface of said base metal member and a predetermined point on said welding torch; and an electrical control loop operable independently of said positional control means and including a welding current control circuit coupled across said welding electrode and said base metal member for establishing and sustaining a weld puddle whereby the arc voltage occurring between the welding electrode and the surface of the weld puddle is exclusively a function of the distance between the tip of the electrode and the surface of the puddle, said electrical control circuit comprising, (a) a constant current source, (b) a constant voltage source adapted to provide a variable output current and having an output voltage the magnitude of which is at least equal to said arc voltage, both said sources having respective first and second output terminals of like polarity, (c) first circuit means coupling said first output terminal of said constant current source to said welding torch electrode, (d) second circuit means coupling said second output terminal of said sources to said base metal member, (e) third circuit means coupling said first output terminal of said constant voltage source to said welding torch electrode, said constant voltage source establishing a reference voltage at its respective first output terminal which is at least equal in magnitude to the arc voltage appearing at the electrode side of said third circuit means whereupon a difference between the reference voltage and a lower arc voltage occurring due to any tendency to lose weld penetration causes a current to flow from said constant voltage source which in combination with the constant current supplied from said constant current source provides a resultant current of the proper magnitude to effect an equality between the magnitude of the reference voltage and the arc voltage and thereby provide a null position of said weld puddle.

2. The apparatus as defined by claim 1 wherein said proximity sensor means produces an output voltage which varies as a function of the distance of the welding torch from said base metal member, and additionally including means for providing a predetermined reference voltage and means for producing an error voltage in accordance with the variation of said output voltage as compared with said reference voltage and circuit means coupled to said welding torch and being responsive to said error voltage to position and maintain said welding torch at substantially constant distance as determined by said reference voltage.

3. The invention as defined by claim 2 wherein said last recited circuit means comprises a torch device motor.

4. The apparatus as defined by claim 1, wherein said constant voltage source has an output voltage greater than said arc voltage and comprises a voltage supply having an output current response faster than the spring rate of the weld puddle and includes current limiting means such that when a predetermined maximum output current limit is reached said source switches to a constant current mode, and reverting back to a constant voltage mode when the output current falls below said current limit.

5. The apparatus as defined by claim 1, wherein said constant voltage source has an output voltage normally greater than said arc voltage and said third circuit means includes a series connected impedance between said welding torch electrode and said one output terminal of said constant voltage source.

6. The apparatus as defined by claim 5, wherein said impedance comprises a resistor.

7. The apparatus as defined by claim 1, wherein said constant voltage source has an output voltage normally greater than said arc voltage and said third circuit means includes blocking diode means coupled between said first output terminal of said constant voltage source and said first output terminal of said constant current source for preventing current flow from said constant current source to said constant voltage source in the event that said arc voltage exceeds the output voltage of said constant voltage source.

8. The apparatus as defined by claim 7, and additionally including a resistor connected in series between said blocking diode means and said first output terminal of said constant voltage source, whereby any addition of current supplied by said constant voltage source is determined by the voltage difference across said resistor divided by the ohmic value of said resistance.

9. The invention as defined by claim 1, wherein said welding torch positional control means comprises: a base metal member surface proximity sensor coupled to said welding torch and providing an electrical output signal corresponding to an indication of the distance separating the surface of said base metal member and said welding torch; a torch position control motor coupled to said welding torch; a proximity reference voltage source; a servo amplifier circuit coupled to the output signal of said proximity sensor and said reference voltage source, and being operable to provide an error signal output therefrom; and a torch position control motor coupled to the welding torch and being responsive to said error signal output from said amplifier circuit to position the welding torch a predetermined constant separation distance with respect to the surface of said base metal only as a function of the distance separating the surface of the base metal member and the welding torch.

10. The apparatus as defined by claim 1, wherein said positional control means includes means for automatically positioning said welding torch only with respect to the surface of said base metal.

11. The apparatus as defined by claim 10, wherein said means for automatically positioning said welding torch comprises, a reference voltage source providing an output $e_r$, a proximity sensor power source coupled to said proximity sensor wherein said proximity sensor provides an output signal $e_i$ corresponding to the distance of the welding torch above the surface of said base metal, a summing point coupled to said reference voltage source and said proximity sensor, said summing point being operable to algebraically sum the signals $e_i$ and $e_r$ and provide an error signal output $e_e$, and a servo motor coupled to said welding torch responsive to the error signal $e_e$ for moving said welding torch and said proximity sensor in the proper direction to cause the error signal $e_e$ to assume a substantially zero value.

* * * * *